(12) United States Patent
Watson

(10) Patent No.: US 10,054,226 B1
(45) Date of Patent: Aug. 21, 2018

(54) MECHANICAL SEALING SYSTEM

(71) Applicant: Billy Dean Watson, Whitney, TX (US)

(72) Inventor: Billy Dean Watson, Whitney, TX (US)

(*) Notice: Subject to any disclaimer, the term of this patent is extended or adjusted under 35 U.S.C. 154(b) by 390 days.

(21) Appl. No.: 14/952,259

(22) Filed: Nov. 25, 2015

(51) Int. Cl.
| F16J 15/00 | (2006.01) |
| F16J 15/40 | (2006.01) |
| F16J 15/44 | (2006.01) |
| F16J 15/447 | (2006.01) |

(52) U.S. Cl.
CPC ........... *F16J 15/004* (2013.01); *F16J 15/002* (2013.01); *F16J 15/40* (2013.01); *F16J 15/447* (2013.01); *F16J 15/4472* (2013.01); *F16J 15/44* (2013.01)

(58) Field of Classification Search
CPC .......... F16J 15/002; F16J 15/004; F16J 15/40; F16J 15/406; F16J 15/447; F16J 15/4472
See application file for complete search history.

(56) References Cited

U.S. PATENT DOCUMENTS

| 2,195,496 | A | * | 4/1940 | Reed | F16J 15/36 |
| | | | | | 277/421 |
| 3,684,301 | A | * | 8/1972 | Malaval | F16J 15/40 |
| | | | | | 277/589 |
| 4,386,786 | A | * | 6/1983 | Agrama | F04D 29/126 |
| | | | | | 277/411 |
| 4,770,424 | A | * | 9/1988 | Otto | B61F 15/22 |
| | | | | | 277/351 |
| 4,799,808 | A | * | 1/1989 | Otto | B61F 15/22 |
| | | | | | 277/349 |
| 4,881,829 | A | * | 11/1989 | Koelsch | F16C 33/76 |
| | | | | | 277/317 |
| 4,895,460 | A | * | 1/1990 | Grzina | F16C 33/80 |
| | | | | | 277/419 |
| 5,014,998 | A | * | 5/1991 | Lauridsen | F16J 15/183 |
| | | | | | 277/504 |
| 5,022,836 | A | * | 6/1991 | Tokumitsu | F04C 27/009 |
| | | | | | 418/104 |
| 5,221,095 | A | * | 6/1993 | Orlowski | F16J 15/008 |
| | | | | | 277/303 |
| 5,607,165 | A | * | 3/1997 | Bredemeyer | F16J 15/406 |
| | | | | | 277/320 |
| 5,772,216 | A | * | 6/1998 | Bredemeyer | F16J 15/406 |
| | | | | | 277/318 |
| 5,904,356 | A | * | 5/1999 | Mundy | F01D 11/003 |
| | | | | | 277/417 |
| 8,152,443 | B1 | | 4/2012 | Pemberton | |
| 2003/0015840 | A1 | * | 1/2003 | Davis | F16J 15/004 |
| | | | | | 277/320 |
| 2014/0346850 | A1 | * | 11/2014 | Shibata | F16C 33/6633 |
| | | | | | 301/109 |

* cited by examiner

*Primary Examiner* — Nicholas L Foster
(74) *Attorney, Agent, or Firm* — Buskop Law Group, P.C.; Wendy Buskop

(57) ABSTRACT

A mechanical sealing system for preventing leakage of a fluid from a housing. The mechanical sealing system has a housing, wherein the housing contains the fluid. A shaft penetrates the housing. A narrow fluid flow path directs a leaked fluid from the housing. A labyrinth seal constrains the leaked fluid from the narrow fluid flow path. A stationary seal constrains a flow of the leaked fluid from the labyrinth seal and a grease seal for constraining the flow of the leaked fluid from the stationary seal.

15 Claims, 1 Drawing Sheet

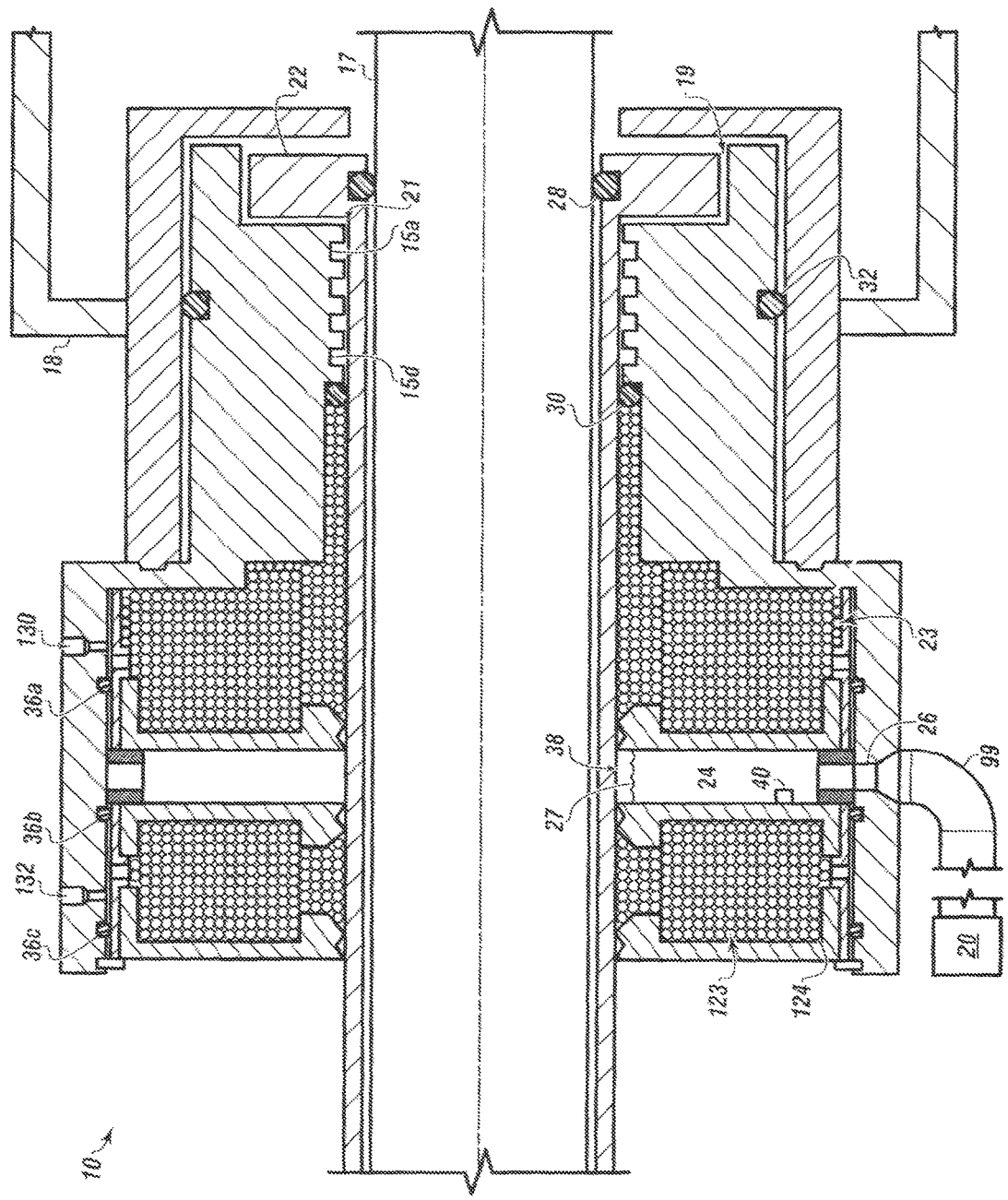

MECHANICAL SEALING SYSTEM

FIELD

The present embodiments generally relate to a mechanical sealing system.

BACKGROUND

Rotating equipment used in the industry often require mechanical sealing in the region where a shaft driven by a motor enters a housing. Equipment such as pumps, blowers, mixers, and compressors can often contain fluid within the housing. It is desirable to seal the shaft entry to prevent any fluid in the housing from entering the atmosphere or affecting shaft bearings.

A typical mechanical seal will utilize a sealing face that is rotating against another sealing face. The sealing faces are held together by mechanical means, such as springs, hydraulic pressure, or a combination thereof.

An inherent part of a mechanical seal is the paradoxical notion that it must leak in order to work. Almost all mechanical seals utilized for rotating equipment utilize the process fluid as lubrication for the seal faces. As such, some process fluid flows through the mechanical seal and exit the housing.

While this is typically a small amount of fluid, the problem is significant when pumping caustic, corrosive, or otherwise dangerous fluids.

In addition to process fluid being used to lubricate the seal faces, mechanical seals are often very sensitive to process upsets or deflections of the shaft. System conditions such as pump or compressor cavitation can cause the shaft to deflect along its rotational axis. This can in turn cause the seal surfaces to separate and allow significant leakage.

In instances where hard but brittle materials such as Silicon Carbide are utilized for seal faces, impact of the seal faces against one another during upset conditions can cause cracking or shattering of the seal faces.

Upset conditions can also cause radial deflections of the shaft, leading to sealing surface misalignment, uneven loading, and potential failure of the seal.

Often, double mechanical seal arrangements are utilized for critical equipment. Costly, bulky, and heavy bearing frame assemblies are often utilized to help minimize shaft deflections that mechanical seals are sensitive to.

When a mechanical seal fails, the fluid within the housing can leak to the atmosphere or into the bearing frame assembly. This can cause significant injury to personnel, violate environmental regulations, violate occupational safety regulations, and damage surrounding equipment.

A need exists for a cost efficient mechanical sealing system for preventing the leakage of a fluid to the atmosphere.

A further need exists for a mechanical sealing system wherein upon a failure, leakage can be directed through a drain to a safe containment area, activate a shut-down of the equipment, or an alarm.

The present embodiments meet these needs.

BRIEF DESCRIPTION OF THE DRAWINGS

The detailed description will be better understood in conjunction with the accompanying drawings as follows:

The FIGURE depicts a cross sectional view of a mechanical sealing system according to one or more embodiments.

The present embodiments are detailed below with reference to the listed FIGURE.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present embodiments generally relate to a mechanical sealing system for preventing the leakage of a fluid by constraining a flow of leaked fluid through the usage of a narrow fluid flow path and various seals.

The present embodiments generally relate to a mechanical sealing system that can prevent leakage, contain pressure, or exclude contamination. The mechanical sealing system can prevent leakage of a fluid from a housing by using a narrow fluid flow path and various seals. The various seals can include a labyrinth seal, a stationary seal, and a grease seal. The labyrinth seal can be proximate the stationary seal. The stationary seal can be proximate the grease seal.

The embodiments further relate to a mechanical sealing system having a housing, a shaft, a narrow fluid flow path, a labyrinth seal, a stationary seal, and a grease seal.

The present invention is cost efficient by providing all of the safety and environmental protection of multiple redundant seals at the cost of single mechanical seals.

The present invention requires a minimal amount of grease to maintain barrier grease, which can be automated for virtually maintenance free operation.

In embodiments, the installation can be a one piece cartridge design, which can slide on shaft and bolts to existing rotating equipment for easy installation.

The present embodiments relate to a mechanical sealing system for preventing leakage of a fluid from a housing. While the system can be used in any situation where a housing containing fluid must be penetrated, a typical use can be to seal a shaft entry point to a housing for a piece of rotating equipment.

The term "shaft" as used herein can refer to a rotating element entering a housing. The term "housing" as used herein can refer to any portion of a piece of equipment that can volumetrically constrain a fluid. For example, the drive shaft of a pump which can be connected to an impeller and a pump casing can serve as the shaft and housing. The term "fluid" as used herein can refer to any process liquid or gas that it is desirable to seal within a housing.

The present invention can be mounted directly onto a shaft, or in embodiments can use a shaft sleeve to be mounted. Utilizing a shaft sleeve facilitates the manufacture of the mechanical sealing system in a cartridge form for easy installation.

The mechanical sealing system can have a narrow fluid flow path proximate the housing to constrain the flow of process fluid from the housing. This narrow fluid flow path can have a close tolerance to the shaft or the shaft sleeve, if used. The close tolerance can be adjusted based upon viscosity, specific gravity, density, and other pertinent characteristics of the process fluid. Persons having ordinary skill in the art can easily determine the appropriate tolerance to use to constrain the flow of a specific liquid.

A secondary stationary seal, such as an O-ring or other equivalent to a toric joint can be used to close off the narrow fluid flow path at a desired location. Various seals such as X-rings, D-rings, Q-rings, gaskets, and the like are well known to, and selectable by persons having ordinary skill in the art for this purpose.

The mechanical sealing system can have a labyrinth seal for constraining any fluid that is leaked from the narrow fluid flow path. The labyrinth seal can be distal to the housing from the narrow fluid flow path.

Labyrinth seals typically have very low friction wear and, therefore, long lives. Often high speed applications prefer the use of such a seal. Further, fluid takes a significantly long time to travel through the tortuous path within a labyrinth seal. The tolerance between the labyrinth seal and the shaft or shaft sleeve, if used, can be adjusted by persons having ordinary skill in the art in the same manner as discussed above.

The mechanical sealing system can have a stationary seal for constraining any fluid that is leaked from the labyrinth seal. Any equivalent to a toric joint or gasket can be utilized for this purpose. The stationary seal can be distal to the housing from the labyrinth seal.

The mechanical sealing system can have a grease seal for constraining any fluid that is leaked from the stationary seal. The grease seal can be distal to the housing from the stationary seal.

While referred to as a grease seal due to common usage, any barrier fluid as desirable to impede the specific process fluid can be utilized, and need not be limited to grease. For many applications, grease can suffice as the barrier fluid but any reasonable barrier fluid can be selected by persons having ordinary skill in the art.

The mechanical sealing system can have a grease inlet port for injecting grease or other barrier fluid into the grease seal. The inlet port can be fed by manually, or by means of an automated system. Levels and pressures of barrier fluid can be adjusted by persons having ordinary skill in the art based upon the specific application.

In embodiments, the mechanical sealing system can have a secondary grease seal in a secondary inlet port.

The mechanical sealing system can have a drain distal to the housing from the grease seal. In embodiments, the drain can be situated in between a first and a secondary grease seal.

The drain can direct any leaked fluid to a containment area, empty to a flare, or be proximate a sensor for detecting fluid. The sensor can communicate with a control system, or activate an alarm when a fluid is present.

In this manner, a highly effective and reliable sealing system with redundant sealing systems can be cost effectively manufactured to replace current usage of double mechanical seals.

The present invention is less sensitive to system upsets or shaft deflections, and has significantly fewer failure modes than currently used devices.

Turning now to the FIGURE, the FIGURE depicts a mechanical sealing system according to one or more embodiments.

The mechanical sealing system 10 can have a housing 18, which can contain a fluid.

A shaft 17 can penetrate the housing. The shaft can also rotate. A shaft sleeve 22 can be attached to the shaft by a shaft sleeve attachment 28. The shaft sleeve can be a cylindrical, hollow tube. The shaft sleeve attachment can be O-rings, D-rings, snap rings, or any other means used by persons having ordinary skill in the art.

A narrow fluid flow path 19 can direct a leaked fluid 27 from the housing 18 towards a labyrinth seal 21 or a secondary stationary seal 32. The narrow fluid flow path 19 can be close tolerance, which can ensure minimum leakage.

In embodiments, a first stationary seal 30 can constrain a flow of the leaked fluid from the labyrinth seal. The first stationary seal 30 can be O-rings, wedges, V-rings, rubber boots, U-cups, or Chevrons.

The labyrinth seal 21 can constrain the leaked fluid 27 from the narrow fluid flow path 19. The labyrinth seal can also be non-contacting, which means the labyrinth seals do not come into contact with the shaft 17 or the shaft sleeve 22, if used. The labyrinth seal can be made from steel, aluminum, thermoplastic, or any material as required by a specific application.

The labyrinth seal 21 can have a plurality of grooves 15a-15d. The plurality of grooves can press tightly inside an axle, or inside a hole, so that the leaked fluid has to pass through a long and tortuous path to escape. In embodiments, the labyrinth seal can control the passage of the leaked fluid through the plurality of grooves by centrifugal motion. The centrifugal motion can help prevent containment ingress and lubricant loss.

The secondary stationary seal 32 can constrain the leaked fluid 27 from the narrow fluid flow path 19. The secondary stationary seal can be O-rings, wedges, V-rings, rubber boots, U-cups, or Chevrons.

A grease seal 24 can constrain a flow of the leaked fluid from the first stationary seal 30. The mechanical sealing system 10 can comprise a grease inlet port 130 for injecting grease 23 into the grease seal 24. The grease can be grease, oil, or any applicable barrier fluid. The grease injected inside the grease seal can provide lubrication for the shaft.

The mechanical sealing system 10 can comprise a secondary grease seal 124. A secondary grease inlet port 132 can inject a secondary grease 123 into the secondary grease seal 124. The secondary grease can be grease, oil, or any applicable barrier fluid. The secondary grease seal can provide lubrication for the shaft.

In embodiments, the mechanical sealing system 10 can comprise a plurality of grease stationary seals 36a, 36b and 36c. The plurality of grease stationary seals can constrain the flow of leaked grease from the grease inlet port 130 or the secondary grease inlet port 132.

A gap 38 between the grease seal and the secondary grease seal can drain the leaked fluid 27 to a drain 26. In embodiments, a sensor 40 to detect fluid can be proximate the drain. The leaked fluid contained in the drain can be routed 99 to a flare or a containment vessel 20.

The sensor 40 can be an optical sensor, a level switch, a pressure sensor, or any other means as known to persons having ordinary skill in the art for the detection of fluid.

While these embodiments have been described with emphasis on the embodiments, it should be understood that within the scope of the appended claims, the embodiments might be practiced other than as specifically described herein.

What is claimed is:

1. A mechanical sealing system for preventing leakage of a fluid from a pump, the mechanical sealing system comprising:
   a housing, wherein the housing contains a fluid;
   a shaft penetrating the housing attached to a motor;
   a cylindrical hollow tubular shaft sleeve attached to the shaft by a shaft sleeve attachment;
   a narrow fluid flow path proximate the housing for directing the fluid from the housing;

a labyrinth seal distal to the housing from the narrow fluid flow path for constraining the fluid from the narrow fluid flow path;

a stationary seal distal to the housing from the labyrinth seal for constraining a flow of the fluid from the stationary seal and restricting grease from entering the pump housing when the pump has no pressure; and a grease seal having a cavity filled with grease, distal to the housing from the stationary seal for constraining the flow of the fluid from the stationary seal;

a secondary grease seal having a cavity filled with grease positioned apart from the grease seal;

a gap axially positioned between the grease seal and the secondary grease seal having a drain for draining the leaked fluid from the grease seal.

2. The mechanical sealing system of claim 1, comprising a grease inlet port for injecting the grease into the grease seal.

3. The mechanical sealing system of claim 2, wherein the grease in the grease seal is for lubrication for the shaft.

4. The mechanical sealing system of claim 1, wherein the drain is connected to a flare or a containment vessel for draining the fluid into the flare or containment vessel.

5. The mechanical sealing system of claim 1, further comprising a sensor proximate the drain to detect the fluid when the fluid is leaking from the housing.

6. The mechanical sealing system of claim 5, wherein the sensor is in electronic communication with a control system, or the sensor activates an alarm.

7. The mechanical sealing system of claim 1, wherein the shaft rotates.

8. The mechanical sealing system of claim 1, wherein the narrow fluid flow path has a close tolerance with the shaft sleeve.

9. The mechanical sealing system of claim 1, wherein the stationary seal comprises an O-ring, a wedge, a V-ring, a rubber boot, a U-cup, or a chevron.

10. The mechanical sealing system of claim 1, wherein the labyrinth seal is proximate the stationary seal, and further wherein the stationary seal is proximate the grease seal.

11. The mechanical sealing system of claim 1, wherein the labyrinth seal has a plurality of grooves.

12. The mechanical sealing system of claim 1, wherein the labyrinth seal controls the passage of the fluid.

13. The mechanical sealing system of claim 1, wherein the labyrinth seal comprises at least one of: steel, aluminum, or thermoplastic.

14. The mechanical sealing system of claim 1, wherein the labyrinth seal is non-contacting.

15. The mechanical sealing system of claim 1, comprising a secondary stationary seal for constraining the flow of the leaked fluid from the narrow fluid flow path.

* * * * *